Figure 1:
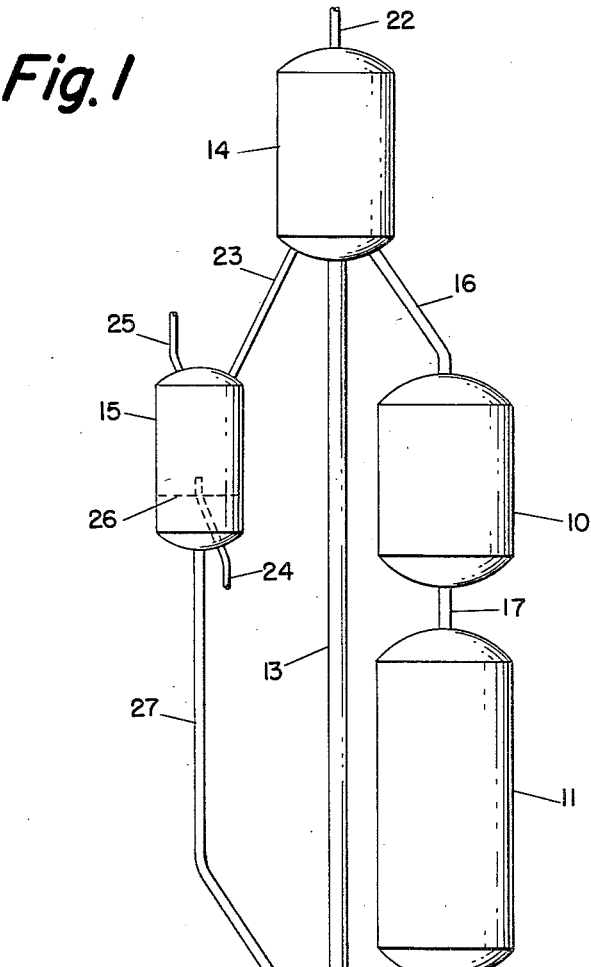

March 22, 1955  W. L. McCLURE  2,704,691
TRANSPORTATION OF GRANULAR SOLIDS
Filed Nov. 10, 1951

INVENTOR.
WILLIAM L. McCLURE
BY
Busser and Smith
ATTORNEYS

United States Patent Office 2,704,691
Patented Mar. 22, 1955

2,704,691

TRANSPORTATION OF GRANULAR SOLIDS

William L. McClure, Toledo, Ohio, assignor to Sun Oil Company, Philadelphia, Pa., a corporation of New Jersey Application November 10, 1951, Serial No. 255,815

3 Claims. (Cl. 302—53)

This invention relates to a method of introducing granular solids as two separate compact streams having substantially different flow rates into a confined zone through which the solids from the stream having the greater flow rate continuously move downwardly as a compact mass. The invention also relates to apparatus by which the method of the invention can be performed.

In the circulation of granular solids through a process system including a downflow path for granular solids and an upflow path for granular solids, it frequently occurs that it is necessary somewhere in the process system to introduce two compact streams of granular solids by gravitation into a common receiving vessel. For example, in a hydrocarbon conversion system wherein granular solids are circulated through a primary system comprising contacting zones in the downflow path through which the solids gravitate as a compact mass, a gas lift engaging vessel positioned at a low level in the system, a seal leg solids conduit extending downwardly from a contacting zone to the engaging vessel, and a lift conduit extending upwardly from the engaging vessel to a high level in the system, it is customary to continuously remove from the primary solids path a side stream which is elutriated in a manner well known in the art to remove relatively fine particles from the side stream and then to gravitate the elutriated side stream into the gas lift engaging vessel as a compact stream separate from the stream passing through the seal leg solids conduit into the engaging vessel. In such operation the flow rate capacity of the elutriator conduit extending downwardly from the elutriator is substantially less than the capacity of the seal leg solids conduit. It has been found that, in such operation, it is difficult to obtain and maintain the desired rate of flow of solids from the elutriator conduit into the engager. The reason for this fact is apparently that the kinetic energy of the solids passing from the seal leg solids conduit downwardly through the engager as a compact mass to a lower inlet of the lift conduit is sufficiently great, because of the relatively high flow rate of those solids, that the solids from the elutriator conduit having lesser kinetic energy can not readily enter the compact mass which is gravitating toward the lift conduit inlet. This difficulty in obtaining suitable rates of flow of solids from the elutriator conduit into the engager makes it difficult to obtain stabilized operation with constant rates of flow through the elutriator and the elutriator conduit. In prior art operation it has been found that where an elutriator conduit having a size which would be expected to provide the proper rate of flow into the engaging vessel, has been employed, difficulty is frequently experienced in that the elutriator conduit occasionally proves incapable of maintaining the necessary rate of flow of solids so that solids back up in the elutriator and interfere with the elutriation operation therein.

According to the present invention it has been discovered that the rate of introduction of a compact stream of granular solids through a conduit of given size into a compact mass of solids which is fed also by a conduit having greater flow capacity and which is moving continuously in a generally downward direction through a confined zone, can be substantially increased by locating the outlet end of the first named conduit substantially beneath the surface of the compact bed into which it feeds. The reason for this fact is not definitely known, but it is believed that the presence of the wall of the first named conduit within the compact bed causes the solids moving in the bed adjacent the outlet of the first named conduit to have their kinetic energy reduced by the deflecting action of the conduit wall. This reduction in kinetic energy is believed to be the result of the interrupting of the straight line flow of the solids by the conduit wall and the resulting turbulence in the solids adjacent the conduit wall. By reducing the kinetic energy of the solids moving past the outlet of the conduit, it is possible to introduce solids from the conduit into the compact mass at a greater rate than can be obtained when the outlet of the conduit is positioned at or above the surface of the moving compact mass.

According to a preferred embodiment of the invention a control is provided for the rate of introduction of solids from a first conduit into a compact mass of solids, which mass is fed also by a second conduit having greater flow capacity. The control is provided by employing as a lowermost portion of the first conduit a conduit section having cross sectional area greater than the average cross sectional area of the first conduit. When this is done the outlet of the conduit section corresponds to and constitutes the outlet of the first conduit as contemplated by the present invention. According to this embodiment of the invention means are provided for adjusting the cross sectional area at the outlet of the conduit section. Examples of means which can be employed for this purpose are described subsequently in connection with the drawing. Provision of a conduit section having relatively large cross section, the outlet of which is positioned beneath the surface of the moving compact mass of solids and has adjustable cross sectional area makes it possible to vary the rate of flow of solids from the conduit into the compact mass in order to compensate for any abnormal flow conditions which may arise in the system, or in order to change the operating conditions for any desired reason. For example, if in the operation of the hydrocarbon conversion system as previously described the solids should begin to back up into the elutriator the cross sectional area at the outlet of the conduit section, according to this preferred embodiment of the invention, can be increased in order to enable solids to flow more rapidly through the elutriator conduit into the engaging vessel, thereby restoring the proper level of granular solids in the elutriator. Such operation is made possible by the present discovery that the rate of flow of solids from an outlet positioned within a moving compact mass of solids is primarily a function of the cross sectional area of the outlet rather than of the average cross sectional area of the main body of the conduit. Thus, when the outlet from such a conduit has a cross sectional area greater than the cross sectional area of the main body of the conduit the rate of flow of solids through the outlet will resemble more nearly the rate of flow of solids from a conduit having the larger cross section than the rate of flow of solids from a conduit having the actual cross section of the main body of the conduit which is being used.

Figure 2:
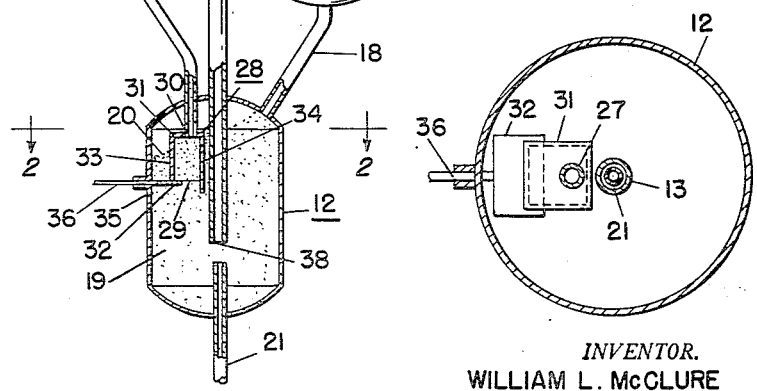

The invention will be further described with reference to the attached drawing which illustrates a solids circulation system such as might be employed in a moving bed hydrocarbon conversion process, Figure 1 being an elevation of the entire system with the gas lift engaging vessel in section, and Figure 2 being a sectional plan view of the engaging vessel.

In the drawing there are shown reaction vessels 10 and 11, gas lift engaging vessel 12, lift conduit 13, disengaging vessel 14, and elutriator 15. In operation granular solids gravitate as a compact mass from the bottom of disengager 14 through line 16 into reaction vessel 10, which may be, for example, a hydrocarbon conversion vessel. Solids gravitate from vessel 10 through line 17 into reaction vessel 11 which may be, for example, a regenerator for granular solids. From vessel 11 the solids gravitate as a compact mass through line 18 into engager 12. The solids thus introduced form a compact mass 19 of granular solids having its upper surface positioned as indicated at 20. Lifting gas is introduced into engager 12 through line 21 and passes into lift conduit 13 carrying with it granular solids from the compact mass 19. The lifting gas having solids suspended therein passes upwardly through lift conduit 13 and discharges into disengager 14. In disengager 14 the solids settle out from the lifting gas and are collected as a compact mass in the bottom of disengager 14. Lifting gas is removed from disengager 14 through line 22. From the bottom of disengager 14 solids gravitate again through line 16 to traverse again the primary solids path described above. As a side stream withdrawn from the primary solids path, granular solids are removed from disengager 14 through line 23 and introduced into elutriator 15. An elutriating gas is introduced into elutriator 15 through line 24 and passes upwardly in elutriator 15 in countercurrent flow to the granular solids which were introduced from line 23, and which fall freely through a portion of the elutriator 15. The elutriating gas entrains the fine particles in the freely falling solids and removes them frem elutriator 15 through line 25. The relatively large particles in the freely falling stream are collected in the bottom of elutriator 15 as a compact mass of solids having upper surface 26. Solids are removed from this compact bed through line 27 which is an elutriator conduit according to the present invention. Conduit 27 extends downwardly through the top of engager 12 and has secured to its lower end a conduit section 28 having larger horizontal cross sectional area than that of conduit 27. Conduit section 28 can have any suitable cross sectional shape. It will be described here as a rectangular box having a lower open end 29 and communicating through an aperture 30, in its otherwise closed top 31, with the lower end of conduit 27. Slidably mounted through wall 35 of engager 12 is a rod 36 secured within engager 12 to a horizontal rectangular baffle plate 32 which is in frictional contact with the lower end of side wall 33 of conduit section 28. The plate 32 has sufficient width to be able to close off entirely the lower end of conduit section 28 when it extends sufficiently far into engager 12 to be in contact with side wall 34 of conduit section 28. By virtue of its dimensions and positioning, baffle plate 32 can be adjusted in such fashion as to make the cross sectional area of the outlet 29 from conduit section 28 either larger, equal to, or smaller than the cross sectional area of conduit 27.

As granular solids gravitate from seal leg conduit 18 downwardly in engager 12 and laterally toward the inlet 38 of lift conduit 13, the solids which gravitate through that part of the engager in which the conduit section 28 is positioned, are deflected in their path of travel by the conduit section 28 and as a result the kinetic energy of the solids which gravitate past the outlet 29 of conduit section 28 have less kinetic energy than they would have if the conduit section 28 were not positioned within the compact mass. Accordingly the solids which gravitate from line 27 into and through conduit section 28 and through outlet 29 into the compact mass of solids within the engager 12, are enabled to flow into the compact mass at a greater rate of flow than could be obtained with apparatus wherein the outlet end 29 of conduit section 28 were positioned at or above the surface 20 of the compact bed 19.

The apparatus and operation as above described are advantageous in that the desired rate of flow through line 27 can be achieved and maintained in stabilized fashion while employing a conduit 27 having relatively small cross sectional area. If the outlet end of the conduit section 28 were positioned at or above the surface of the compact mass in engager 12 a larger conduit 27 would have to be employed in order to obtain the same flow rate. Also, it would be more difficult to obtain a stabilized operation since the effectiveness of having an outlet with varying cross section would not be as great in controlling the flow rate of solids from the outlet if the outlet were positioned at or above the surface of the compact mass of solids.

In the operation illustrated in the drawing, elutriator 15 and regenerator 11 constitute immediate sources of supply of solids to conduits 27 and 18 respectively, which sources of supply are separate, though they both in turn are supplied with solids from disengager 14.

Although in the drawing, the lower flow rate solids stream introduced into the confined zone passes through a conduit having lesser cross sectional area than that of the conduit through which the higher flow rate solids stream is introduced into the confined zone, it is to be understood that in some systems, such cross sectional relationship need not apply. For example, where solids gravitate as compact masses from separate sources of supply of solids through each of two conduits having equal cross sectional area into a confined zone, a greater flow rate can be obtained in one of the conduits by maintaining a higher pressure in the source of supply for that conduit than in the source of supply for the other conduit. In any case, it is advantageous according to the present invention to position the outlet of the conduit, through which the lower flow rate occurs, beneath the surface of the compact bed in the confined zone, in order that the flow of solids from the latter conduit will be continuous and steady at the desired flow rate.

In the apparatus shown in the drawing, the baffle plate 32, in addition to providing means for varying the cross sectional area of outlet 29 of conduit section 28, provides auxiliary means for deflecting solids, in their travel from a position above baffle 32 and adjacent sidewall 35 of engager 12 toward inlet 38 of lift conduit 13, away from the outlet 29 of conduit section 28, and the use of such baffle is therefore preferred according to the invention.

According to the present invention, the conduit outlet within the compact mass of solids is preferably located at a level within the compact mass at which the solids moving in the compact mass past the conduit outlet have a substantial vertical component of direction of flow, since when this is the case, the advantages of the present invention are obtained to a particularly high degree. Thus, in apparatus as shown in the drawing, the outlet 29 is positioned high enough in compact bed 29 so that outlet 29 is substantially above lift conduit inlet 38, the direction of flow of solids past outlet 29 toward inlet 38 therefore being downward as well as lateral.

Although in the drawing, the plate 32 is shown as having sufficient width to be able to close off entirely the lower end of conduit section 28, it is noted that a preferred operation according to the present invention is one in which the plate 32 is never moved close enough to sidewall 34 of conduit section 28 to make the cross sectional area of the outlet 29 of conduit section 28 less than the cross sectional area of conduit 27. This preferred operation avoids one of the disadvantages of prior art operation wherein a valve was employed in a line such as the line 27 to control the solids flow rate: when the valve was set for a low solids flow rate there was a tendency for gas passing upwardly in the line to reduce the solids flow through the valve to a rate lower than desired or to stop the solids flow altogether. This disadvantage is avoided according to the present invention by providing means for controlling the solids flow rate without reducing the cross sectional area through which the solids pass to an area smaller than that of the main line 27. According to the present invention, any suitable arrangement can be provided to vary the cross sectional area of the outlet 29 from conduit section 28.

Another advantage of the present invention over prior art employing a valve in a line such as the line 27 is that in the prior art operation, solids fall freely beneath the valve through the lower part of the line into the engager, rather than moving through that lower part as a compact bed as in operation according to the present invention; and the free fall results in higher attrition of solids and more erosion of the line in the prior art operation.

The invention claimed is:

1. Apparatus for transportation of granular solids which comprises: a downwardly extending conduit adapted to convey such solids and having greater cross-sectional area at its lower end than the average cross-sectional area of said conduit; valve means adjacent said lower end of said conduit and adapted to vary the cross-sectional area available for solids flow; a gas lift engaging vessel communicating with said lower end of said conduit; a second conduit communicating with said engaging vessel and adapted to introduce granular solids thereinto and having its lower end positioned substantially above the lower end of the first-named conduit, the lower end of the first-named conduit being positioned within the path of flow of a compact bed of solids issuing from the lower end of said second conduit; means for withdrawing granular solids from said engaging vessel at a level beneath the lower end of said first-named conduit.

2. Apparatus according to claim 2 wherein a conduit section having greater cross-sectional area than the average cross-sectional area of said first-named conduit constitutes a lowermost portion of said first-named conduit, and wherein said valve means comprise a transverse baffle adjacent the lower end of said conduit section and actuating means associated with said baffle and extending exteriorly of said engaging vessel and adapted to adjust the position of said baffle in order to vary the free cross-sectional area of said lower end of said first-named solids conduit.

3. Apparatus for transportation of granular solids which comprises: an elutriating vessel; a gas lift engaging vessel; a lift conduit extending upwardly from said engaging vessel; a solids conduit extending downwardly from said elutriating vessel to said engaging vessel and adapted to convey granular solids and having as its lowermost portion a conduit section having greater cross-sectional area than the average cross-sectional area of said solids conduit; a transverse baffle within said engaging vessel and adjacent the lower end of said conduit section at a level above the lower end of said lift conduit; actuating means associated with said baffle and extending exteriorly of said engaging vessel and adapted to adjust the position of said baffle in order to vary the free cross-sectional area of said lower end of said solids conduit while maintaining said free cross-sectional area greater than said average cross-sectional area; and a second solids conduit communicating with said engaging vessel and adapted to introduce granular solids thereinto and having its lower end positioned substantially above the lower end of the first-named solids conduit.

References Cited in the file of this patent

UNITED STATES PATENTS

| | | |
|---|---|---|
| 2,459,824 | Leffer | Jan. 25, 1949 |
| 2,490,798 | Gohr | Dec. 13, 1949 |

OTHER REFERENCES

Hondriflow—New Design in Catalytic Cracking—pages 78 and 79 of Oil and Gas Journal, January 13, 1949.